(12) United States Patent
Deivasigamani

(10) Patent No.: US 8,109,242 B2
(45) Date of Patent: Feb. 7, 2012

(54) MULTI-THERMOSTAT ENGINE COOLING SYSTEM

(75) Inventor: Sridhar Deivasigamani, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 280 days.

(21) Appl. No.: 12/292,509

(22) Filed: Nov. 20, 2008

(65) Prior Publication Data

US 2010/0095908 A1    Apr. 22, 2010

Related U.S. Application Data

(60) Provisional application No. 61/106,556, filed on Oct. 17, 2008.

(51) Int. Cl.
*F01P 7/14* (2006.01)

(52) U.S. Cl. .............. 123/41.1; 236/99 K; 236/34.5; 123/41.44

(58) Field of Classification Search ............... 123/25 K, 123/25 Q, 41.08, 41.1, 41.02; 236/12.11, 236/12.1, 12.17, 99 K, 99 J, 93 A, 34.5, 12.18
See application file for complete search history.

(56) References Cited

U.S. PATENT DOCUMENTS

| | | | |
|---|---|---|---|
| 2,377,028 A | 5/1945 | Nicholas | |
| 2,984,460 A | 5/1961 | Gardner et al. | |
| 3,125,081 A | 3/1964 | Jasper | |
| 3,326,192 A | 6/1967 | Gerli | |
| 3,682,380 A * | 8/1972 | Aziz | 236/34.5 |
| 3,759,233 A | 9/1973 | Schlaffer et al. | |
| 3,851,629 A | 12/1974 | Mayr et al. | |
| 3,877,443 A | 4/1975 | Henning et al. | |
| 4,096,861 A | 6/1978 | Bowles | |
| 4,325,219 A | 4/1982 | Stang et al. | |
| 4,385,594 A | 5/1983 | Hauser, Jr. | |
| 4,410,133 A * | 10/1983 | Furukubo | 236/34.5 |
| 4,621,594 A | 11/1986 | Kubis | |
| 4,748,941 A * | 6/1988 | Kashiwase | 123/41.1 |
| 4,883,225 A * | 11/1989 | Kitchens | 236/34.5 |
| 6,745,830 B2 | 6/2004 | Dinh | |
| 2006/0130778 A1 * | 6/2006 | Pottie et al. | 123/41.1 |
| 2007/0062466 A1 | 3/2007 | Engelin et al. | |

* cited by examiner

*Primary Examiner* — Michael Cuff
*Assistant Examiner* — Hung Q Nguyen
(74) *Attorney, Agent, or Firm* — Finnegan, Henderson, Farabow, Garrett & Dunner LLP

(57) ABSTRACT

A cooling system for an engine is disclosed. The cooling system may have a pump driven by the engine to pressurize coolant, a single heat exchanger configured to cool pressurized coolant, and an aftercooler configured to transfer heat from air entering the engine to pressurized coolant. The cooling system may also have a multi-thermostat arrangement configured to always direct at least a portion of the pressurized coolant from the pump through the aftercooler, and selectively direct pressurized coolant from the pump through the single heat exchanger. The multi-thermostat arrangement may also be configured to selectively mix pressurized coolant from the aftercooler with a remaining portion of the pressurized coolant from the pump to form a coolant mixture, and to selectively direct the coolant mixture through the engine or around the engine.

19 Claims, 2 Drawing Sheets

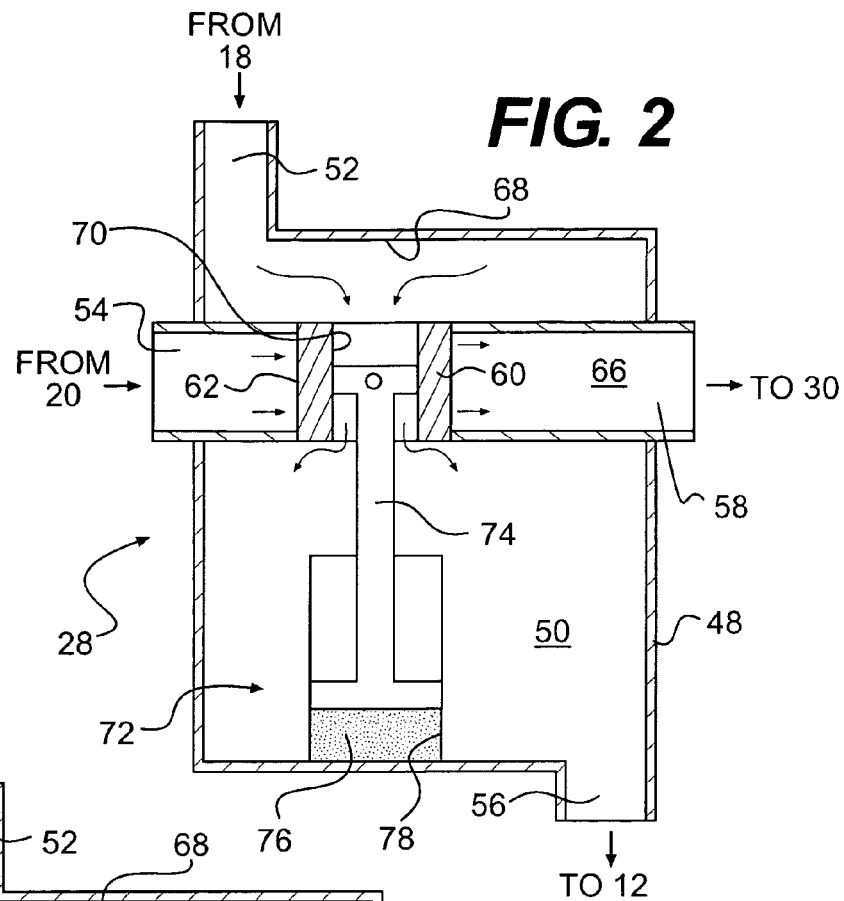
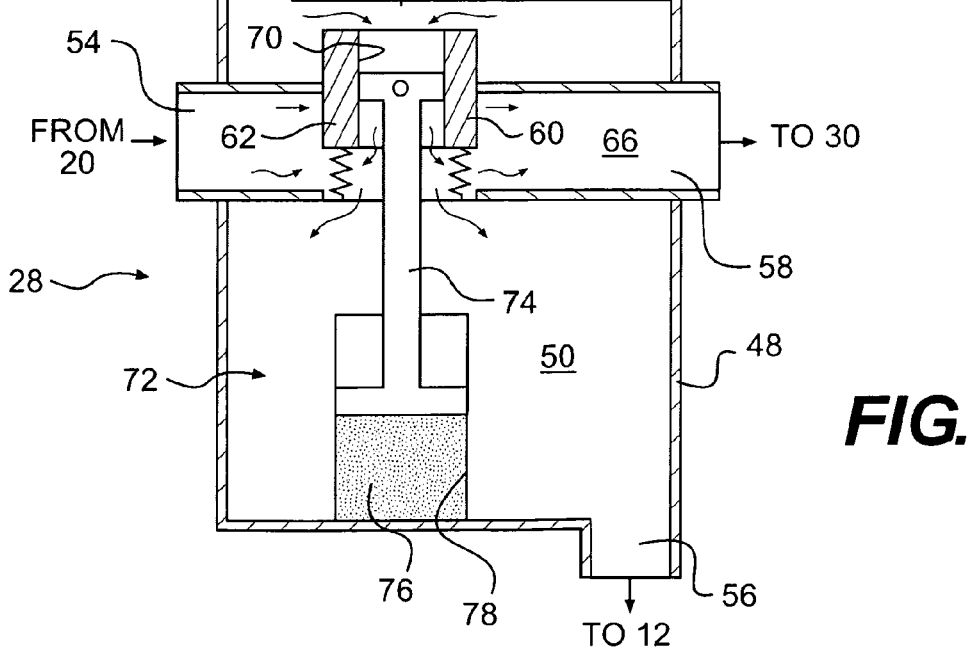

MULTI-THERMOSTAT ENGINE COOLING SYSTEM

RELATED APPLICATIONS

The present disclosure claims the right to priority based on U.S. Provisional Patent Application No. 61/106,556, filed Oct. 17, 2008.

TECHNICAL FIELD

The present disclosure relates generally to an engine cooling system and, more particularly, to an engine cooling system having multiple thermostats to control cooling of fluid and air directed into an engine.

BACKGROUND

Engines, including diesel engines, gasoline engines, and gaseous fuel-powered engines are used to generate mechanical, hydraulic, or electrical power output. In order to accomplish this power generation, an engine typically combusts a fuel/air mixture. With the purpose to ensure optimum combustion of the fuel/air mixture and protect components of the engine from damaging extremes, the temperature of the engine and air drawn into the engine for combustion must be tightly controlled.

An internal combustion engine is generally fluidly connected to several different heat exchangers to cool both liquids and gases circulated throughout the engine. These heat exchangers are often located close together and/or close to the engine to conserve space on the machine. An engine-driven fan is disposed either in front of the engine/exchanger package, in some arrangements, to blow air across the exchangers and the engine, or between the exchangers and engine to suck air past the exchangers and blow air past the engine, the airflow removing heat from the heat exchangers and the engine. In other arrangements cooling fluids from the environment, for example water from a marine environment, can be directed through the engine/exchanger package to remove heat therefrom.

An exemplary cooling system is described in U.S. Pat. No. 4,325,219, (the '219, patent) issued to Stang et al. on Apr. 20, 1982. The '219, patent describes a coolant system for a combustion engine including a turbocharger, an aftercooler, a first radiator, and a second radiator. The coolant system comprises an engine loop and an aftercooler loop, both loops utilizing a single pump. The engine loop includes the pump, the engine's block and head, the first radiator, and a first radiator bypass branch. The aftercooler loop includes the pump, the aftercooler, the second radiator, and a second radiator bypass branch. Each loop further includes a temperature responsive flow control thermostat for regulating the coolant flow through the associated radiator and/or bypass branch.

Although the coolant system of the '219, patent may provide adequate engine cooling, it may be sub-optimal. Specifically, the use of two radiators may increase the cost and complexity of the coolant system. And, the coolant system of the '219, patent may have limited control over coolant temperature within the aftercooler and engine.

The disclosed engine cooling system is directed to overcoming one or more of the problems set forth above and/or other problems of the prior art.

SUMMARY OF THE INVENTION

In one aspect, the present disclosure is directed to a cooling system for an engine. The cooling system may include a pump driven by the engine to pressurize coolant, a single heat exchanger configured to cool pressurized coolant, and an aftercooler configured to transfer heat from air entering the engine to pressurized coolant. The cooling system may also include a multi-thermostat arrangement configured to always direct at least a portion of the pressurized coolant from the pump through the aftercooler, and selectively direct pressurized coolant from the pump through the single heat exchanger. The multi-thermostat arrangement may also be configured to selectively mix pressurized coolant from the aftercooler with a remaining portion of the pressurized coolant from the pump to form a coolant mixture, and selectively direct the coolant mixture through the engine or around the engine.

In another aspect, the present disclosure is directed to another thermostat. This thermostat may include a body at least partially defining a first inlet, a second inlet, a first outlet, and a second outlet. The thermostat may also include a hollow valve element disposed within the body between the first and second inlets and the first and second outlets. The hollow valve element may be movable to selectively direct fluid from only the first inlet through the hollow valve element to the first outlet, and to selectively join fluid received at the first and second inlets. The thermostat may also be configured to selectively direct a portion of the joined fluid to the first outlet, and selectively direct a remaining portion of the joined fluid to the second outlet.

In yet another aspect, the present disclosure is directed to method of cooling an engine. The method may include pressurizing coolant, always directing at least a portion of the pressurized coolant to absorb heat from air entering the engine, and selectively chilling the at least a portion of the pressurized coolant before the at least a portion of the pressurized coolant absorbs heat from air entering the engine. The method may also include selectively mixing the at least a portion of the pressurized coolant with a remaining portion of the pressurized coolant to form a coolant mixture after the at least a portion of the pressurized coolant has absorbed heat from the air, and selectively directing the coolant mixture through the engine or around the engine based on a temperature of the remaining portion of the pressurized coolant.

BRIEF DESCRIPTION OF THE DRAWINGS

FIGS. 2 and 3 are cross-sectional illustrations of an exemplary disclosed thermostat that may be used with the engine system of FIG. 1.

DETAILED DESCRIPTION

Figure 1:
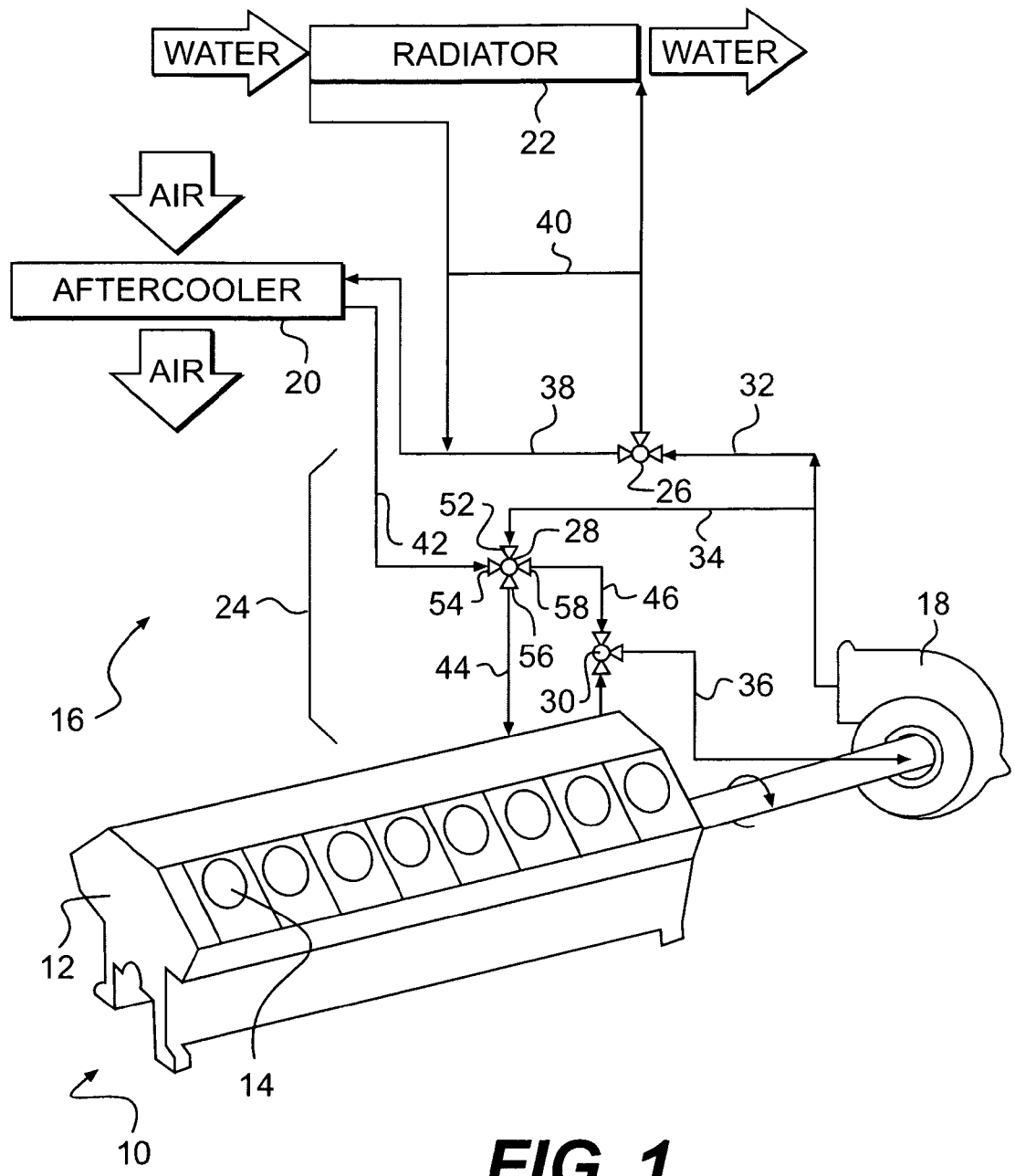
FIG. 1 is a pictorial and schematic illustration of an exemplary disclosed engine system.

FIG. 1 illustrates an exemplary disclosed engine 10 that combusts a fuel/air mixture to produce a power output. Engine 10 may include an engine block 12 that at least partially defines a plurality of cylinders 14. For the purposes of this disclosure, engine 10 is depicted and described as a four-stroke diesel engine. One skilled in the art will recognize, however, that engine 10 may be any other type of combustion engine such as, for example, a gasoline or a gaseous fuel-powered engine. In the illustrated embodiment, engine 10 includes sixteen cylinders 14 (only 8, shown). However, it is contemplated that engine 10 may include a greater or lesser number of cylinders 14, and that cylinders 14 may be disposed in an "in-line" configuration, a "V" configuration, or any other suitable configuration.

As also shown in FIG. 1, engine 10 may be associated with one or more systems that facilitate the production of power. In particular, engine 10 may include, among others, a cooling system 16 having a pump 18, an aftercooler 20, and a heat exchanger 22. Coolant such as water, glycol, a water/glycol mixture, a blended air mixture, or any other heat transferring fluid may be pressurized by pump 18 and selectively directed through aftercooler 20, heat exchanger 22, and/or engine block 12 to transfer heat therewith. After exiting these components, the coolant may be drawn back to pump 18. Coolant flow through cooling system 16 may be regulated by way of a multi-thermostat arrangement 24 that is responsive to temperatures of engine 10.

Pump 18 may be engine-driven to generate the flow of coolant described above. In particular, pump 18 may include an impeller (not shown) disposed within a volute housing having an inlet and an outlet. As the coolant enters the volute housing, blades of the impeller may be rotated by operation of engine 10 to push against the coolant, thereby pressurizing the coolant. An input torque imparted by engine 10 to pump 18 may be related to a pressure of the coolant, while a speed imparted to pump 18 may be related to a flow rate of the coolant. It is contemplated that pump 18 may alternatively embody a piston type pump, if desired, and may have a variable or constant displacement.

Aftercooler 20 may be situated to heat or cool intake air as it enters engine 10. Specifically, aftercooler 20 may be a liquid-to-air type of heat exchanger and, as the flow of intake air is directed through channels of aftercooler 20, heat from that air may be transferred to pressurized coolant in adjacent channels before the air enters engine 10. Alternatively, during cold operation, heat from the pressurized coolant could be transferred to the air, if desired. In this manner, the air entering engine 10 may be maintained within a predetermined temperature range that results in desired operation of engine 10.

Heat exchanger 22 may embody the main radiator (i.e., a high temperature radiator) of engine 10 and be situated to dissipate heat from the coolant before it passes through aftercooler 20 and engine block 12. In one embodiment, engine 10 may be employed in a marine setting, for example as a prime mover or electrical power generator of a marine vessel. As such, heat exchanger 22 may be a liquid-to-liquid type of exchanger configured to draw in water from the marine environment, and transfer heat from the pressurized coolant to the water. Alternatively, heat exchanger 22 could be similar to aftercooler 20 and embody a liquid-to-air type of exchanger, if desired. In either application, the coolant passing through aftercooler 20 and engine block 12 may first be chilled within heat exchanger 22.

Thermostat arrangement 24 may include a first thermostat 26, a second thermostat 28, and a third thermostat 30 that cooperate to control flows of pressurized coolant to and from pump 18. For example, thermostats 26 and 28 may be situated to receive pressurized coolant from pump 18 in parallel manner via separate supply passages 32 and 34, while thermostat 30 may be situated to receive coolant that has already passed through engine block 12 or around engine block 12 before it is directed back to pump 18 via a return passage 36. The amount of pressurized coolant passing to thermostat 26 by way of supply passage 32 may always be less than an amount of pressurized coolant passing to thermostat 28 by way of supply passage 32, and determined, at least in part, by flow-restriction characteristics of supply passages 32 and 34. Alternatively, a valve (not shown) may be located within one of supply passages 32 and 34 or at a junction of the passages to selectively vary the restriction, if desired. In one embodiment, the amount of pressurized coolant passing directly to thermostat 28 may be as much as about two to four times greater than an amount of pressurized coolant passing to thermostat 26 during normal operation of engine 10 (i.e. during operation when a temperature of the coolant from pump 18 is within about 30-100° C.). All coolant flow back to pump 18 may pass through thermostat 30.

In response to a temperature of pressurized coolant passing through thermostat 26, thermostat 26 may selectively direct pressurized coolant received from pump 18 to aftercooler 20 via two separate passages. Specifically, thermostat 26 may selectively direct all of the pressurized coolant directly to aftercooler 20 via a supply passage 38, or direct only a portion of the pressurized coolant through supply passage 38 and a remaining portion first through heat exchanger 22 via a radiator circuit 40 before it is received by aftercooler 20. In one embodiment, at least some pressurized coolant from supply passage 32 may always flow through aftercooler 20. That is, thermostat 26 may never fully close to block all coolant flow from supply passage 32 to aftercooler 20, but instead only function to regulate an amount of pressurized coolant that first passes through heat exchanger 22 before entering aftercooler 20.

In one example, thermostat 26 may have a proportional valve element (not shown) movable between a first end-position associated with full coolant flow to aftercooler 20, and a second end-position associated with nearly full coolant flow to heat exchanger 22. In this example, the valve element of thermostat 26 may be in the first end-position when a temperature of the pressurized coolant is about 30° C. or less, in the second end-position when a temperature of the pressurized coolant is about 40° C. or more, and proportionally located between the first and second end-positions when the temperature of the coolant is in the range of about 30-40° C.

Thermostat 28 may be situated to selectively mix pressurized coolant from aftercooler 20 with pressurized coolant received directly from pump 18 via supply passage 34, and to selectively direct the mixture through or around engine block 12 to thermostat 30. In particular, thermostat 28 may be in direct fluid communication with aftercooler 20 via a passage 42, in direct fluid communication with engine block 12 via a passage 44, and in direct fluid communication with thermostat 30 via a bypass passage 46. In response to a temperature of pressurized coolant passing through thermostat 28, thermostat 28 may selectively direct pressurized coolant received from only pump 18 to engine block 12; or selectively direct a mixture of the coolant received from both pump 18 and aftercooler 20 to engine block 12. Similarly, thermostat 28 may selectively direct all of the coolant received from aftercooler 20 around engine block 12 to thermostat 30, or selectively direct a mixture of coolant received from aftercooler 20 and pump 18 around engine block 12. Thermostat 28 may not, however, pass coolant received directly from only pump 18 around engine block 12 to thermostat 30, or pass coolant received from only aftercooler 20 through engine block 12.

As shown in FIGS. 2 and 3, thermostat 28 may include a body 48 at least partially defining a central cavity 50 having a first inlet 52, a second inlet 54, a first outlet 56, a second outlet 58, and a valve element 60 disposed within body 48 to regulate coolant flow between inlets 52, 54 and outlets 56, 58. Inlet 52 may be in fluid communication with pump 18 via supply passage 34, while inlet 54 may be in fluid communication aftercooler 20 via passage 42. Outlet 56 may be in fluid communication with engine block 12 via passage 44, while outlet 58 may be in fluid communication with thermostat 30 via bypass passage 46.

Valve element 60 may be movable against the bias of a resilient member between multiple positions in response to a temperature of pressurized coolant at first outlet 56 to control coolant flow through thermostat 28. In particular, valve element 60 may be movable between a first end-position, at which pressurized coolant from only inlet 52 is directed to outlet 56, and a second end-position, at which a mixture of pressurized coolant from both of inlets 52 and 54 is directed to both outlets 56 and 58. Valve element 60 may be movable to any position between the first and second end-positions such that a different ratio of the pressurized coolant from inlets 52 and 54 passes to outlets 56 and 58 (i.e., such that a greater amount of pressurized coolant from aftercooler 20 or from pump 18 passes to engine block 12 or around engine block 12). Coolant that passes through aftercooler 20 (or aftercooler 20 and heat exchanger 22) may be relatively cool compared to coolant passing directly to thermostat 28 from pump 18. As such, when pressurized coolant from inlet 52 mixes with pressurized coolant from inlet 54, the resulting mixture may have a moderate temperature between that of the coolant exiting aftercooler 20 and pump 18. And, the temperature of the coolant mixture may be substantially proportional to a position of valve element 60 between the first and second end-positions.

In one embodiment, valve element 60 may be a generally hollow member having an annular sealing surface 62 and a central hollow portion 70. Annular sealing surface 62 may be configured to move through a passage 66 that extends between inlet 54 and outlet 58, when valve element 60 is moved from the first end-position toward the second end-position. Regardless of a position of valve element 60, coolant flow from inlet 54 to outlet 58 may still be possible (i.e., coolant flow from inlet 54 to outlet 58 may pass around annular sealing surface 62. Pressurized coolant from inlet 52 may pass to outlet 56 via central hollow portion 70. As valve element 60 moves away from the first end-position toward the second end-position, an end of annular sealing surface 62 may retract into passage 66 such that coolant from inlet 52 may spill out of valve element 60 and mix with coolant from inlet 54. The resulting coolant mixture may then pass to outlet 56 or to outlet 58. And, as valve element 60 continues movement toward the first position, a greater amount of fluid from within central hollow portion 70 may mix with fluid from inlet 54.

A temperature-respondent actuator 72 may be associated with valve element 60 to move valve element 60 between the first and second end-positions. In one example, actuator 72 may embody a piston assembly 74 driven by the expansion of a wax pellet 76 located within a sealed chamber 78. Wax pellet 76 may be substantially solid at low temperatures, but as the pressurized coolant passing through thermostat 28 warms, wax pellet 76 may melt and expand. Sealed chamber 78, under the pressure of expanding wax pellet 76, may act on piston assembly 74 to extend valve element 60 from the first end-position toward the second end-position, thereby allowing chilled coolant from aftercooler 20 to mix with fluid from pump 18 and pass through thermostat 28 to engine block 12 via inlets 52 and 54 and outlet 56. As the temperature of the coolant increases, the extension of valve element 60 toward the second end-position may likewise increase to allow a greater flow of chilled coolant to enter and cool engine block 12. In one embodiment, valve element 60 may be in the first end-position when the temperature of the pressurized coolant at wax pellet 76 is about 80° C. or lower, in the second end-position when the temperature of the pressurized coolant at wax pellet 76 is about 90° C. or higher, and proportionally located between the first and second end-positions when the temperature of the coolant is in the range of about 80-90° C.

Returning to FIG. 1, in response to a temperature of pressurized coolant passing through thermostat 30, thermostat 30 may selectively direct coolant from thermostat 28 and/or from engine block 12 to pump 18 via return passage 36. Specifically, thermostat 30 may selectively direct all of the pressurized coolant from thermostat 28 and engine block 12 to pump 18 via return passage 36, selectively direct all of the pressurized coolant from only engine block 12 to pump 18 via return passage 36, or direct all of the coolant from engine block 12 and only a portion of the coolant from thermostat 28 to pump 18.

In one example, thermostat 30 may have a proportional valve element (not shown) movable between a first end-position associated with full coolant flow from engine block 12 and thermostat 28 via bypass passage 46 to pump 18, and a second end-position associated with full coolant flow from only engine block 12 to pump 18. In this example, the valve element of thermostat 30 may be in the first end-position when a temperature of the pressurized coolant is about 95° C. or less, in the second end-position when a temperature of the pressurized coolant is about 100° C. or more, and proportionally located between the first and second end-positions when the temperature of the coolant is in the range of about 95-100° C.

INDUSTRIAL APPLICABILITY

The disclosed cooling system may be used in any machine or power system application where it is beneficial to tightly control engine temperatures. The disclosed system may be particularly suited for marine applications, where water from the marine environment may used for cooling purposes. The disclosed cooling system may provide cooling of both air and coolant that enters or bypasses the system's engine. Operation of cooling system 16 will now be described.

During operation of engine 10, the various operational fluids thereof may be undesirably heated or cooled beyond acceptable operational ranges. For example, coolant may be circulated through and absorb heat from engine block 12, the external walls of cylinders 14, and/or cylinder heads associated with each cylinder 14 for cooling purposes. Air pressurized by a turbine- or engine-driven compressor (not shown) may rise in temperature as a result of the pressurization and, when mixed with fuel and combusted, may heat up even more. If unaccounted for, these high temperatures could reduce the effectiveness or even result in failure of their respective systems. In contrast, when operating in extremely cold conditions, the coolant, oil, and/or air may be too cold for efficient or proper operation.

In order to help maintain proper operating temperatures of the various engine systems, the fluids of each system may be directed through heat exchangers for heat transfer purposes. For example, the intake air upstream or downstream of the compressor may be directed through aftercooler 20 before entering engine block 12. As the intake air flows through aftercooler 20, a flow of coolant from pump 18 may absorb heat from or provide heat to the intake air. If necessary, the coolant may first flow through heat exchanger 22 before passing through aftercooler 20 such that sufficient heat may be removed from or imparted to the air. Similarly, the coolant may pass through engine block 12 and directly remove heat from or impart heat to components of engine 10. Operational examples are provided below with respect to FIGS. 2 and 3.

As previously described, coolant may flow from pump 18 through supply passage 32 to thermostat 26, and simultaneously from pump 18 through supply passage 34 to inlet 52 of thermostat 28 at a ratio of about one-to-four (i.e., a greater amount of coolant may pass direct to thermostat 28 than through aftercooler 20 to thermostat 28 by about two to four times). During cold conditions, for example when a temperature of the coolant from pump 18 is less than about 30° C., the valve element of thermostat 26 may remain in or move to the first end-position such that all of the coolant from supply passage 32 passes directly to aftercooler 20 via supply passage 38 (i.e., without first passing through and being chilled by heat exchanger 22). After absorbing heat from the air entering engine 10, the coolant may be directed from aftercooler 20 into thermostat 28 via passage 42 and inlet 54.

Because, the temperature of the coolant in thermal contact with wax pellet 76 (i.e., the coolant received directly from pump 18 via supply passage 34) is less than 30° C. in this first example (i.e., less than the modulating temperature range of thermostat 28), valve element 60 of thermostat 28 may remain in the first end-position (i.e., wax pellet 76 may be solid as shown in FIG. 2), and only the larger flow of coolant received directly from pump 18 may pass through outlet 56 to engine block 12. In this scenario the lesser flow of coolant received from aftercooler 20 may bypass engine block 12 via outlet 56 and bypass passage 46. Because the flow rate of coolant passing through engine block 12 may be less than the combined flow rate from pump 18, less cooling of engine block 12 may occur than if the flow of coolant from aftercooler 20 additionally passed through engine block 12.

As long as the temperature of the coolant passing through engine block 12 is less than about 95° C. (i.e., less than the modulating range of thermostat 30), both flows of coolant from engine block 12 and from bypass passage 46 may pass through thermostat 30 substantially unrestricted and be directed back to pump 18. However, as engine block 12 and the coolant passing therethrough warms above about 95° C., the valve element of thermostat 30 may move to selectively restrict and eventually block the flow of coolant bypassing engine block 12 such that the flow of coolant passing through engine block 12 increases proportionally. Because the modulating range of thermostat 30 may be higher than the modulating range of thermostat 28, the valve element of thermostat 30 should not move to restrict the bypass flow of coolant until after valve element 60 has already started to move toward its second end-position at which coolant from aftercooler 20 and pump 18 mix prior to entering engine block 12.

Over time, the operation of engine 10, combined with operation of pump 18 and aftercooler 20 may act to warm the coolant of cooling system 16. And, as the coolant from pump 18 heats above about 30° C., thermostat arrangement 24 may operate differently. Specifically, when the coolant exiting pump 18 has a temperature within the modulating range of thermostat 26, for example about 35° C., some of the coolant within supply passage 32 may first pass through heat exchanger 22, before passing through aftercooler 20 such that the coolant is chilled to some degree and can absorb greater amounts of heat. As long as the coolant exiting aftercooler 20 remains less than about 80° C. (i.e., less than the modulating temperature range of thermostats 28 and 30), operation of thermostats 28 and 30 may remain as described above in the first example.

However, as the coolant continues to warm and exceeds about 80° C. at wax pellet 76, valve element 60 of thermostat 28 may begin to move toward its second end-position (shown in FIG. 3). As valve element 60 moves toward its second end-position, coolant received directly from pump 18 via inlet 52 and some coolant received directly from aftercooler 20 via inlet 54 may mix within central cavity 50 to form a coolant mixture directed to engine block 12. As the temperature of the coolant continues to warm, a greater amount of the coolant from aftercooler 20 may join the mixture and be passed to engine block 12. In this manner, a greater flow of chilled coolant may be made available to engine 12.

Further, as the temperature of the coolant exceeds about 95° C. (i.e., as the temperature of the coolant exceeds the lower threshold of the modulation range of thermostat 30, the valve element of thermostat 30 may move to inhibit bypass coolant flow such that an even greater amount of chilled coolant may be caused to pass through engine block 12. This movement of the valve element of thermostat 30 toward the second end-position may continue until all coolant from pump 18 passes through heat exchanger 22, aftercooler 20, and then engine block 12.

The disclosed cooling system may provide a simple and low cost solution to engine cooling modulation. That is, because cooling system 16 utilizes only a single heat exchanger in conjunction with an aftercooler and a pump, the system may have relatively few components. The low number of components may facilitate a simple and low cost system. In addition, the disclosed multi-thermostat arrangement may provide fine control over engine temperatures.

It will be apparent to those skilled in the art that various modifications and variations can be made to the disclosed cooling system without departing from the scope of the disclosure. Other embodiments of the cooling system will be apparent to those skilled in the art from consideration of the specification and practice of the cooling system disclosed herein. It is intended that the specification and examples be considered as exemplary only, with a true scope of the disclosure being indicated by the following claims and their equivalents.

What is claimed is:

1. A thermostat, comprising:
    a body at least partially defining a first inlet, a second inlet, a first outlet, and a second outlet;
    a hollow valve element disposed within the body between the first and second inlets and the first and second outlets, the hollow valve element being movable to:
        selectively direct fluid from the first inlet through the hollow valve element to the first outlet;
        selectively join fluid received at the first and second inlets;
        selectively direct a portion of the joined fluid to the first outlet;
        selectively direct a remaining portion of the joined fluid to the second outlet;
    a wax-driven piston member connected to move the hollow valve element; and
    a resilient member configured to bias the hollow valve element against the force of the wax-driven piston member toward a position such that whenever a temperature of fluid within the thermostat is below a modulation temperature of the hollow valve element, fluid from the first inlet is directed only to the first outlet.

2. The thermostat of claim 1, wherein the modulation temperature of the hollow valve element is about 80-90° C.

3. The thermostat of claim 1, wherein the hollow valve element is movable to selectively direct fluid from only the first inlet through the hollow valve element to the first outlet.

4. A thermostat, comprising:
    a body at least partially defining a first inlet, a second inlet, a first outlet, and a second outlet; and
    a hollow valve element disposed within the body between the first and second inlets and the first and second outlets, wherein the hollow valve element forms a first passage connecting the first inlet to only the first outlet when the hollow valve element is in a first position, and wherein when the hollow valve element is disposed in the first position, fluid from the first inlet flows only to the first outlet and only through the hollow valve element.

5. The thermostat of claim 4, wherein the hollow valve element is cylindrical and includes a first open end and a second opposing open end.

6. The thermostat of claim 4, wherein the body forms a second passage connecting the second inlet to only the second outlet when the hollow valve element is in the first position.

7. The thermostat of claim 6, wherein the hollow valve element is disposed within the second passage and fluid flows around an exterior of the hollow valve element from the second inlet to the second outlet when the hollow valve element is in the first position.

8. The thermostat of claim 7, wherein, the hollow valve element extends from one side of the second passage completely to a second opposing side of the second passage when the hollow valve element is in the first position.

9. The thermostat of claim 8, wherein the hollow valve element extends from one side of the second passage only part way through the second passage toward the second opposing side of the second passage when the hollow valve element is in a second position.

10. The thermostat of claim 6, wherein an end of the hollow valve element opens into the second passage only when the hollow valve element is in a second position.

11. The thermostat of claim 6, wherein the second passage is open to the first and second outlets only when the hollow valve element is in the second position.

12. The thermostat of claim 6, wherein:
the body at least partially forms a central cavity having the first inlet and the first outlet; and
the second passage extends through the central cavity.

13. The thermostat of claim 6, wherein the first passage is generally perpendicular to the second passage.

14. A thermostat, comprising:
a body at least partially defining a first inlet, a second inlet, a first outlet, and a second outlet;
a valve element disposed within the body between the first and second inlets and the first and second outlets, wherein the valve element fluidly connects the first inlet to only the first outlet and the second inlet to only the second outlet when the valve element is in a first position, and the valve element is movable to a second position to:
join fluid received at the first and second inlets;
direct a portion of the joined fluid to the first outlet; and
direct a portion of the joined fluid to the second outlet; and
at least one member that controls the position of the valve element based on fluid temperature, wherein the at least one member biases the valve element to the first position whenever a temperature of fluid in the thermostat is below a modulation temperature of the thermostat.

15. The thermostat of claim 14, wherein the valve element forms an internal first passage connecting the first inlet to the first outlet when the valve element is in the first position.

16. The thermostat of claim 15, wherein the body forms a second passage connecting the second inlet to the second outlet when the valve element is in the first position.

17. The thermostat of claim 16, wherein the valve element is disposed within the second passage and fluid flows around an exterior of the valve element from the second inlet to the second outlet when the valve element is in the first position.

18. The thermostat of claim 17, wherein:
the valve element extends from one side of the second passage completely to a second opposing side of the second passage when the valve element is in the first position; and
the valve element extends from one side of the second passage only part way through the second passage toward the second opposing side of the second passage when the valve element is in a second position.

19. The thermostat of claim 16, wherein:
an end of the valve element opens into the second passage only when the valve element is in a second position;
wherein the second passage is open to the first and second outlets only when the valve element is in the second position; and
the body at least partially forms a central cavity having the first inlet and the first outlet; and
the second passage extends through the central cavity.

* * * * *